Oct. 19, 1971 L. W. PARKER 3,613,227
METHOD OF MAKING STATOR ASSEMBLIES FOR AXIAL AIRGAP MACHINES
Filed Dec. 12, 1969 4 Sheets-Sheet 1
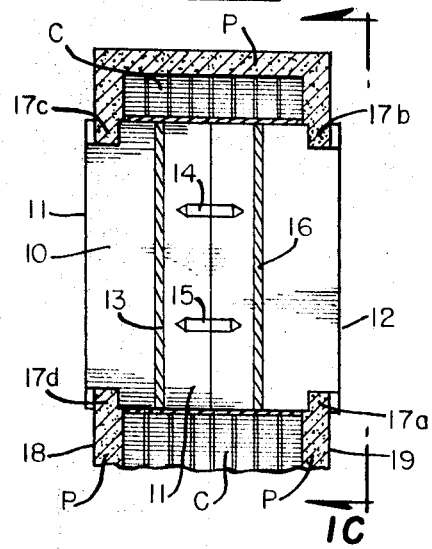
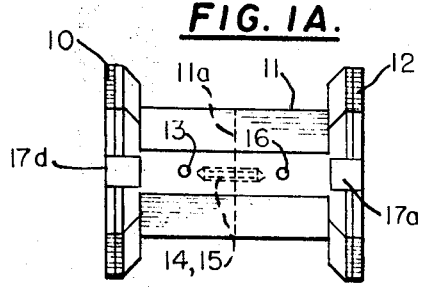
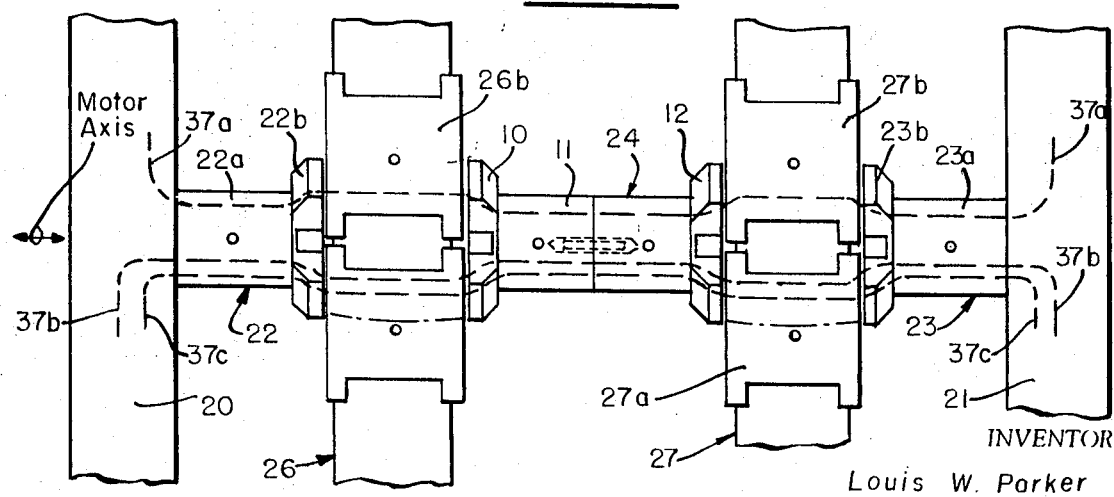
INVENTOR
Louis W. Parker
BY
ATTORNEY

INVENTOR
LOUIS W. PARKER

Oct. 19, 1971  L. W. PARKER  3,613,227
METHOD OF MAKING STATOR ASSEMBLIES FOR AXIAL AIRGAP MACHINES
Filed Dec. 12, 1969  4 Sheets-Sheet 3

INVENTOR
LOUIS W. PARKER

BY *Hall, Pollock & Vande Sande*

INVENTOR
LOUIS W. PARKER

United States Patent Office
3,613,227
Patented Oct. 19, 1971

3,613,227
METHOD OF MAKING STATOR ASSEMBLIES FOR AXIAL AIRGAP MACHINES
Louis W. Parker, 2408 Sunrise Key Blvd.,
Fort Lauderdale, Fla. 33304
Continuation-in-part of application Ser. No. 699,196, Jan. 19, 1968. This application Dec. 12, 1969, Ser. No. 884,401
Int. Cl. H02k 15/00
U.S. Cl. 29—596  8 Claims

ABSTRACT OF THE DISCLOSURE

An axial airgap machine stator is fabricated by sequentially positioning halved laminated blocks between casting pressure plates, each such block, when completed, consisting of a comparatively narrow central laminated portion integral with comparatively wider end lamination portions. Preformed stator coils are positioned between the halved blocks in staggered relation to one another in an arrangement providing a plurality of radially extending voids. The voids are blocked by plugs whereafter plastic material is poured into the casting plates, and cured. The plastic material, during subsequent cooling, contracts to secure the halved blocks forceably together adjacent said stator coils. After the cooling step, the blocking plugs are removed from the assembly to leave radial voids between the assembled stator coils and lamination blocks.

CROSS REFERENCE TO RELATED APPLICATION

The present application is a continuation-in-part of my prior copending application Ser. No. 699,196, filed Jan. 19, 1968, now abandoned, for "Method of Making Stator Assemblies for Axial Airgap Machines," and relates to the method of forming stator assemblies adapted for use in machine arrangements of the types described in my copending application Ser. No. 699,089, filed Jan. 19, 1968, for "Improved Stator Assemblies for Axial Airgap Machines," now U.S. Pat. No. 3,484,636, issued Dec. 16, 1969.

BACKGROUND OF THE INVENTION

The present invention relates to dynamo-electric machines particularly of the axial airgap type, and is more specifically concerned with an improved method of fabricating stator assemblies for such machines to provide for efficient magnetic and coil arrangements and effective cooling of the stators.

The general mechanical features and operating principles of axial airgap machines have already been described in my prior U.S. Pats. No. 2,479,589, No. 2,734,140, No. 3,277,323, and No. 3,296,475. The present invention incorporates the disclosures of these prior patents by reference for a complete discussion of the principles utilized and the constituent elements incorporated into axial airgap machines; and a further discussion of these principles and elements will accordingly not be given in this case.

In my prior U.S. Pats. No. 2,734,140 and No. 3,296,475 the machines described are arranged to induce a flow of cooling air along the central shaft of the machine with said air then being caused to exit radially outward through airgaps provided between the adjacent rotor and stator assemblies of the machine. My prior Pat. No. 2,734,140 also discloses a method of fabricating rotors and stators to provide an appropriate airgap therebetween through which such cooling air can pass. This fabrication method for the stator contemplates positioning lamination stacks of oriented magnetic material, surrounded by coils, in a casting plate; and a plastic supporting material is poured into said plate in completely surrounding relation to the coils, so as to form a solid stator adapted to permit the flow of cooling air only along the exterior of said stator.

The fabrication technique described previously involves some difficulties in inserting coils into place, does not achieve a coil arrangement of optimum configuration and, further, does not produce a stator having air flow channels within the body of the stator itself. The fabrication technique contemplated by the present invention achieves improvements in all of these areas.

SUMMARY OF THE INVENTION

The stator produced by the fabrication technique of the present invention utilizes a plurality of laminated stator blocks each of which, in its final form, consists of a recessed central portion disposed between a pair of protruding end portions. Each stator block is fabricated in separate parts which are placed sequentially in a casting plate to facilitate the insertion of coils between blocks. The stacks for each stator block are so fabricated that plastic material, subsequently poured into the casting plate and cured therein, forms tabs overlying portions of the laminated stacks; and as the plastic material contracts following its curing step, a substantial force is imposed on the stacks holding the parts of each stator block forceably together without the need for auxiliary fastening means therebetween.

Prior to the pouring operation, pre-formed coils of rectangularly shaped wires are positioned between the separate parts of the stator blocks. The use of such preformed coils achieves a substantial saving in space over that ordinarily required for the reception of hand-shaped round wire bundles of coils, sometimes known as "mush" coils. The compact pre-formed coils are, moreover, distributed in the casting mold in staggered relation to one another between the stator lamination stacks; and the coil arrangement is such that a plurality of radial voids or channels are provided in the assembly with one such void being disposed between each adjacent pair of lamination stacks. Teflon forming tubes are inserted into each of these radial voids, and the opposing ends of these tubes are then fitted with plugs, to assure that any plastic material subsequently poured into the casting plate cannot fill the said radial voids. After the plastic material has been poured, and the material cured, the plugs and radial plastic forming tubes are removed to leave a composite assembly integrated by plastic matrix material, and providing a plurality of radial air-flow channels within the body of the stator itself.

BRIEF DESCRIPTION OF THE DRAWINGS

FIGS. 1A, 1B and 1C are three views of an improved magnetic pole stack which is used in the stator fabrication technique of the present invention;

FIG. 2 is a diagrammatic view of a portion of the magnetic components of an axial airgap machine;

DESCRIPTION OF THE PREFERRED EMBODIMENT

The improved stator fabrication technique of the present invention employs magnetic blocks of the types illustrated in FIGS. 1A, 1B and 1C. Each stator block is constructed in two parts, as will be discussed hereinafter. Each of these parts comprises a laminated, recessed central portion 11 integral with an outwardly extending laminated end portion (10 or 12); and each part is formed of a plurality of laminations preferably cemented together with an appropriate insulating cement (epoxy) and baked at a moderately high temperature (e.g. 200° C.) to form a solid block. The material employed in the laminations comprises grain oriented silicon steel.

Drilled or die-stamped holes 13 and 16 are provided respectively in the laminations of the two stator block parts to accommodate a screw or rivet holding the laminations in assembled relation for purposes of fabricating milling operations. After these milling operations are completed, the rivet or screw disposed in each of holes 13 and 16 is removed therefrom, and is replaced by a pin of non-conducting material, e.g., Bakelite, held in place by an appropriate cement to assure alignment of the individual laminations during subsequent cementing and baking operations.

Figure 3:
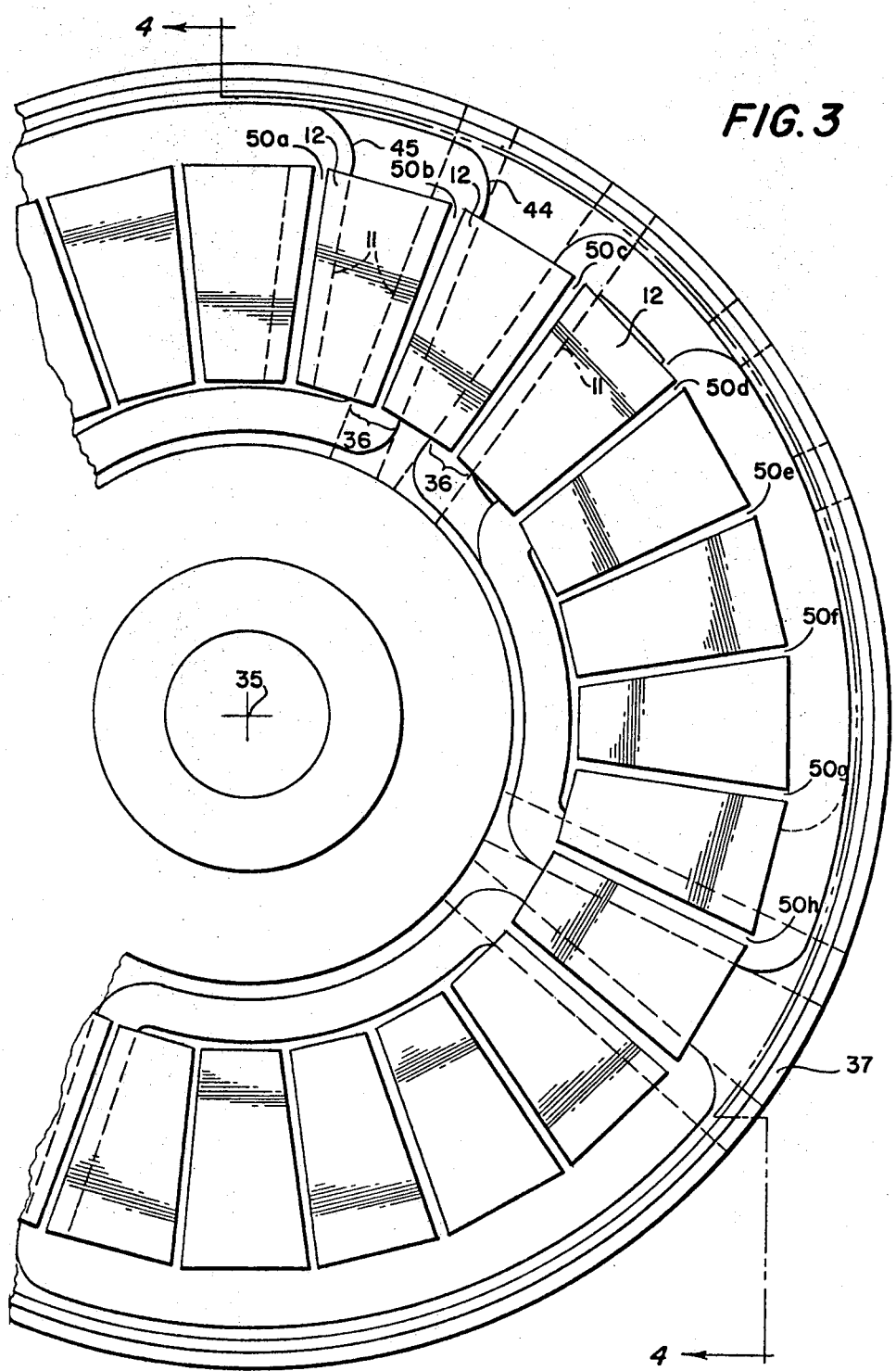
FIG. 3 is a partial view of a stator assembly viewed along the axis of the machine without its plastic encapsulating matrix; and illustrates the disposition of coils and lamination stacks utilized in the present invention.

As may be best appreciated from FIGS. 1A and 1C, portions of the laminated stacks are tapered in configuration. Moreover, the middle portion 11 of each stack is narrower in width than end portions 10 or 12. When a plurality of assembled stacks are placed in a circular array (for example as shown in FIG. 3), the "recessed" configuration of each narrower portion 11 provides a space between stacks into which coil windings C can be placed as the stator is assembled. The actual coil configuration used, and its prefered disposition, will be discussed hereinafter.

Notches 17a through 17d inclusive are machined or punched at the top and bottom of each stack. Notches 17a and 17d are located adjacent the narrower ends of the stack and notches 17b and 17c are disposed adjacent the wider ends of each stack. When the stacks are disposed relative to one another in the arrangement shown in FIGS. 1A through 1C, and then placed in a casting plate, plastic material P poured into such a casting plate tends to form small tabs of elastic material adjacent each of the notches 17a through 17d. The plastic material fills the casting plate to the levels indicated in FIG. 1B by lines 18 and 19 so as to cover portion 11 completely. End portions 10 and 12 are only partially covered, however, so that the end portions 10 and 12 protrude outwardly from the plastic matrix material. The matrix material P is then cured at an elevated temperature causing it to solidify. On cooling, the cured plastic matrix material tends to contract at a greater rate than the steel laminations in the stacks, and this produces a force which forceably presses the laminations, as well as the parts of each stator block, together.

To facilitate the placing of coils around the stacks when assembling, the following method is employed: the stator blocks are made in two pieces, each of which comprises one of the end portions 10, 12 and a related central portion 11; and these two pieces later have their central portions 11 cemented together at dotted line 11a. The two halves of each lamination stack can be formed directly in the configurations described, or can be formed by initially fabricating a complete structure of the type shown in FIG. 1A which is then cut in half along line 11a.

When placing the stacks into a casting plate to hold them in place, only one half of each stator block is used initially. This permits the placing of coils C over the narrow portions 11. After all the coils are properly placed, the second half of each block is placed over the coils and in close contact with the half blocks initially mounted on the casting plate.

In order to obtain greater accuracy in fitting the two halves of each block together, small metal pins 14 and 15 are placed into holes previously drilled into the laminations 11 for this purpose. Before this pin fitting operation, a small amount of adhesive may be placed on the surfaces to be fitted together. However, it is the plastic material P (epoxy) which is intended to hold everything in its final fixed position. Thus, after the parts have been assembled in the sequence described, plastic material P is poured into place, cured, and cooled so as to contract and firmly hold the entire assembly together.

Oriented steel is used for the laminations of stator blocks 10–12, while no-oriented steel is used for the end rings (such as 20 and 21). The reason for this will be best appreciated by reference to FIG. 2, which illustrates certain magnetic components of an axial airgap machine, but does not show the stator coils, shaft, bearings, frame, etc. In an axial airgap machine of the general type shown in FIG. 2, the stator assembly may consist of a pair of spaced laminated magnetic end rings 20 and 21 to each of which are attached plural stator lamination assemblies. Typical such end lamination assemblies are designated 22 and 23. One or more mid-stators can also be provided in spaced relation to the end stator members; and one lamination block of one such mid-stator has been designated 24. The mid-stators and end stators are spaced to provide regions therebetween for rotor assemblies 26 and 27. Each of the stator portions comprises a plurality of laminated blocks entirely similar to the typical blocks designatted 22, 23, and 24, radially spaced from one another about the axis of the machine. Each mid-stator block 24 may, more particularly, comprise a structure entirely similar to those already described in reference to FIG. 1, consisting of a laminated central portion 11 integral with wider end portions 10 and 12. By the same token, each end stator lamination block may consist of grain oriented laminated portions 22a or 23a affixed at one of their ends to end ring 20 or 21, and integral with end lamination portions 22b and 23b similar in configuration to lamination portions 10 or 12.

Rotor 26 may comprise a plurality of magnetic lamination stacks such as 26a, 26b, etc., mounted in radially spaced relation to one another about the axis of the machine. Similarly rotor 27 may comprise a plurality of rotor stacks such as 27a, 27b, etc. Arrangements of this type are described in my prior patents identified earlier, and need not be further described here.

During the operation of the machine, lines of flux designated by broken lines 37a, 37b, and 37c are generated by the windings of the machine and follow a path through the stator magnetic stacks which path begins and ends on a line substantially parallel to the axis of the motor. However, it will be noted that the flux lines are bent somewhat as they pass through the stator stack ends 22b, 10, 12, and 23b, due to rotation of the rotor past these stack ends. Even more importantly, it will be noted that the lines of flux experience an approximate 90° turn as they pass from the stator lamination sections into the end rings 20 and 21.

It is very desirable from the standpoint of efficiency, motor weight and economy, to use a minimum of steel in the design and construction of any motor. This desirable result can be achieved by incorporating high permeability steel for as many applications as possible. A well-known technique of steel fabrication, discussed in my prior patents identified earlier, produces laminations exhibiting a very high permeability along a particular axis in the lamination (corresponding to the direction in which the steel strip was previously rolled). However, in steels of this type, if the direction of the magnetic lines of force departs by more than a few degrees from the orientation axis of the lamination, a very substantial reduction in effective permeability results. Accordingly, greater economies are achieved without affecting the magnetic characteristics of the overall structure through the substitution of non-oriented steels a appropriate places. This improvement is achieved in the present invention by fabricating the magnetic end rings 20 and 21 of non-oriented steel laminations, e.g., by tape-winding such end rings.

Figure 4:
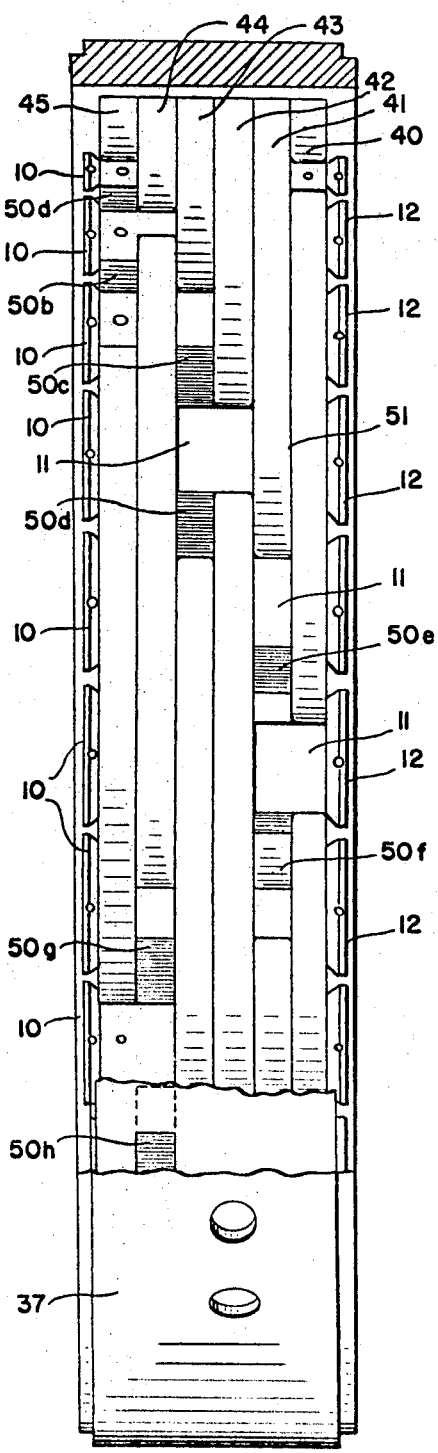
FIG. 4 is a side view of the arrangement shown in FIG. 3, taken on line 4—4 of FIG. 3.

FIGS. 3 and 4 illustrate how a plurality of lamination blocks of the types previously described, are assembled in relation to one another, and in relation to preformed coil windings, in the stator fabrication method of the present invention. It will be appreciated, of course, that the overall stack and coil arrangement shown in FIGS. 3 and 4 corresponds to the arrangement of these parts as they would be placed in the casting plates (to be described hereinafter in reference to FIGS. 5 and 6); and FIGS. 3 and 4 do not depict the plastic matrix material in order that the disposition of parts can be best observed.

A plurality of lamination blocks are assembled in a ring configuration about a central axis 35 corresponding to the motor axis. Each of the stacks consists of end portions 10 and 12, and an intervening narrower portion 11 (see FIG. 4) whereby a space 36 (FIG. 3) is provided between each adjacent pair of lamination stacks for the reception of coils. In practice, the stacks are held in position relative to one another in appropriate recesses formed in a pressure casting plate (to be discussed hereinafter in reference to FIGS. 5 and 6); and the number of recesses thus provided in each pressure plate may be appropriately selected in accordance with the desired number of motor stator slots per pole, and the winding arrangement to be employed. In one case, corresponding to the example shown in FIG. 3, twenty-four such recesses are provided for receiving a corresponding number of lamination blocks; but a greater or fewer number of blocks may be utilized.

Inasmuch as the torque capability of an axial airgap motor is a function of the area of the stator pole stacks, which area increases as the square of the diameter of placement of the stacks, and since moreover, the torque developed is directly proportional to the radius arm measured outward from the axis 35 of the stator to the point where the torque is assumed to be generated, the torque actually developed is a third power function of this radius. Accordingly, it is highly preferable that pre-formed coils be used of a shape making the most efficient use of the space at the outer periphery of the motor lying between an outermost stator ring 37 in the motor and the lamination stacks. The coils used in the fabrication technique of the present invention, in accordance with this consideration, are preferably formed of rectangular section copper conductors, and are pre-formed over specially shaped dowels yielding a thickness to the coils in their curved sections which is identical to their thickness at the points where the coil turns pass over the laminaton stacks and through the region 36 between adjacent lamination stacks.

By way of comparison, techniques utilized heretofore employing partially pre-formed or "mush" coils are more wasteful of space inasmuch as an approximately round bundle of coils (as opposed to the rectangular section conductors of the present invention) protrude out relatively further from the pole stacks, due to the hand bending and shaping which must be utilized in any wiring process with such mush coils. Mush coils, in order that they may be shaped in place, require a round section wire to facilitate the sliding of one wire over another in the coil, and this results in a further increase in peripheral wire space of approximately 27 percent. The combined saving in space where pre-formed coils of rectangular cross section wires are utilized, is in the order of 48 percent; and to this saving must be added the space ordinarily required to hand shape round wire bundles of coils as they emerge from the pole slots. The use of the improved coil configurations contemplated by the present invention, in association with flat insulators 51 (see FIG. 4) of uniform shape inserted between adjacent coils of different potentials provides a degree of safety impossible to achieve with the "mush" coil technique of the prior art, and further achieves a substantial volumetric space saving. The overall result is, therefore, to far simplify the wiring technique, minimize the space which must be employed, and simultaneously to produce a stator which has optimum torque generation.

Pre-formed coils of the type described above are positioned between the several lamination stacks, utilizing a partially distributed winding technique. More particularly, examining FIG. 4, a plurality of coils 40 through 45 inclusive have been shown in position, with said coils being mounted in staggered relation to one another relative to the several spaces 36 between adjacent lamination stacks 10-11-12. A similar disposition of other coils will be apparent from FIG. 4; and, in the particular distributed winding technique illustrated in FIGS. 3 and 4, the motor is provided with two coils per pole per phase. The winding arrangement employed is such that each space 36, between adjacent lamination stacks, is not completely filled or covered by coils. More particularly, it will be noted from FIG. 4 that, in the axial direction of the stator, the several spaces 36 are substantially equal in width to the composite width of six coils. The windings are so distributed, however, that only five coils pass through or cover the space 36 between any pair of adjacent lamination stacks, leaving a void or open channel which extends radially between the lamination stacks. These voids or channels are designated 50a through 50h inclusive in the partial representation of FIG. 4; and in an overall stator employing twenty-four stator blocks, there would be twenty-four such radial channels located respectively between each adjacent pair of lamination stacks.

The several channels 50a etc., produced by this coil and stator block arrangement, can be utilized for the passage of cooling air through the body of the stator itself, whereby far more efficient stator cooling is achieved than in the arrangements of my prior patents identified earlier.

Figure 6:
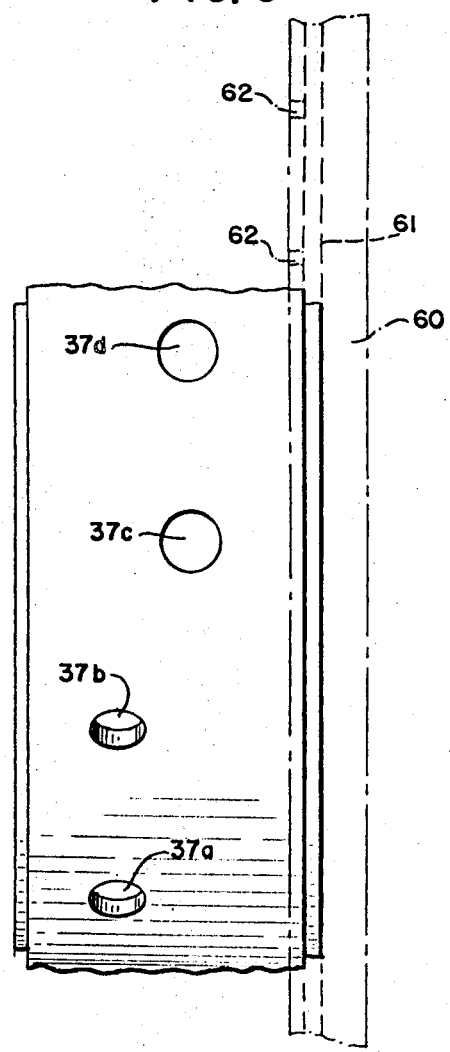
FIG. 6 is an end view of a portion of the structure shown in FIG. 5, taken on line 6—6 of FIG. 5.
Figure 5:
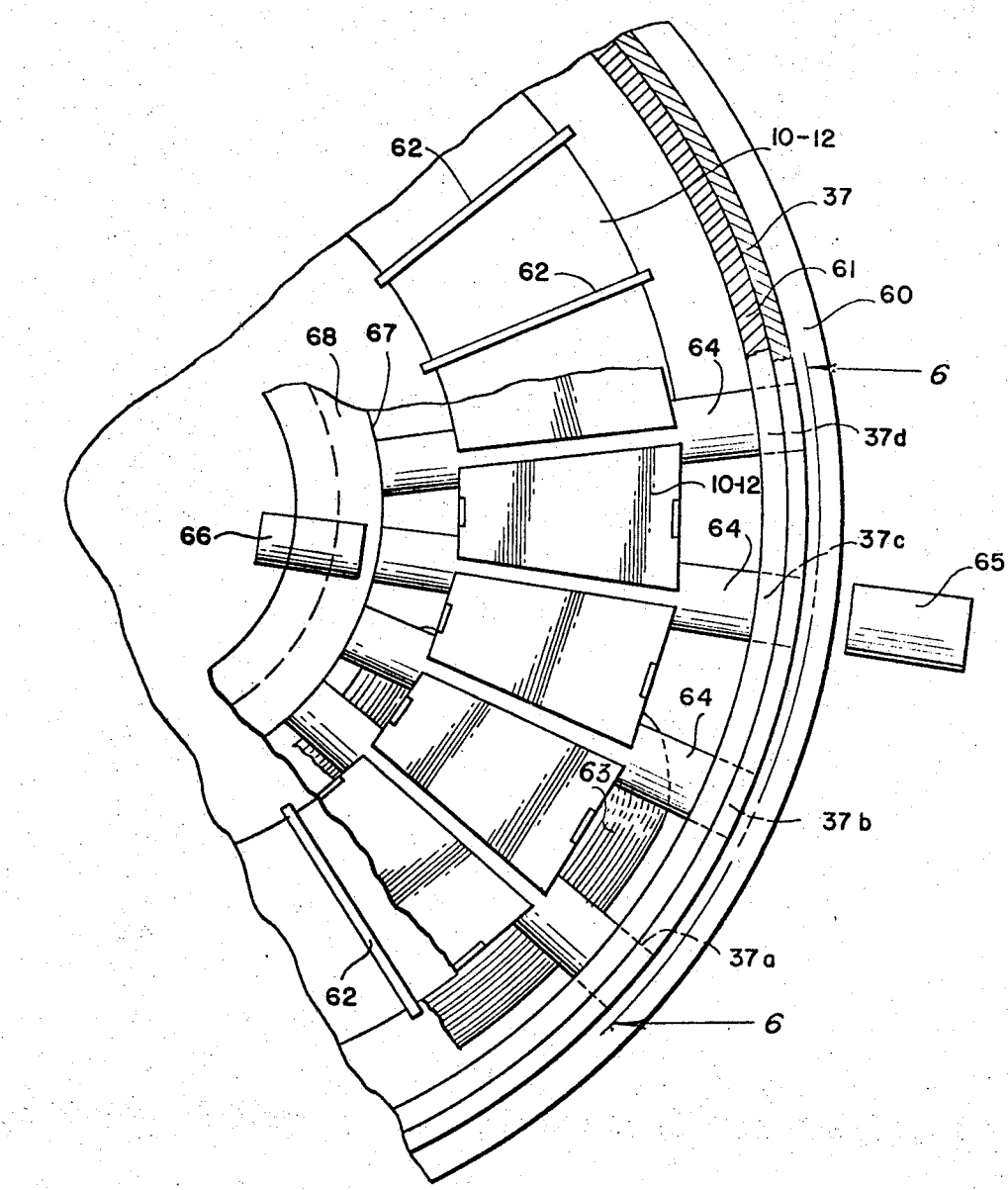
FIG. 5 is a partial view of a casting plate having elements disposed therein in accordance with the present invention, prior to the plastic pouring operation.

Turning now to FIGS. 5 and 6, the technique employed to effect overall fabrication of an improved stator utilizing the various elements described earlier, will now be discussed. A pair of opposed casting plates are utilized, between which plates the various lamination stack halves, coils, etc., are appropriately placed in the sequence described previously. One such plate 60 has been shown in FIGS. 5 and 6. Each casting plate is provided with a peripheral circular recess 61 milled into the plate, into which recess the stator ring 37 is placed. Stator ring 37 is provided with apertures 37a, 37b, 37c, 37d, etc., located at positions facing the radial voids or cooling channels which are ultimately formed in the stator, there being one such recess 37a etc., for each such radial channel.

Each casting plate 60 is provided with a plurality of angularly spaced radial barrier strips 62 upstanding from the inner surface of the plate and adapted to accurately position the several stator lamination blocks 10-12 therebetween. The stator blocks 10-12, the several pre-formed coils (one of which has been designated 63 in FIG. 5), and the needed insulators 51 (FIG. 4), are properly positioned in a lower casing plate in the sequence described previously, i.e., one half of each lamination block is positioned in place, the coils are inserted, and the other half of each lamination block is then aligned with the first half by metal pins 14, 15 (FIG. 1). For the reasons discussed in reference to FIG. 4, the overall procedure produces a radial void between each adjacent pair of stator blocks. With the stator ring 37 in place, plastic forming tubes 64 are passed through the several stator ring apertures 37a etc., and thence through the radial voids between lamination blocks in a radial direction toward the central axis of the casting plate. These tubes can be formed of any appropriate material, and Teflon has been found to be entirely adequate. Small plugs 65 and 66 are then inserted into the opposing ends of each forming tube 64 thereby sealing each radial channel against the entrance of liquid plastic material. A cylindrical plug 67 is then fastened to the casting plate 60 at its center, with the outer periphery of central plug 67 bearing firmly against the inner radial plugs 66.

With the several parts assembled on a lower casting plate in the manner described, an opposing casting plate or ring is placed on top of the stack across the upper edge of stator ring 37. This upper casting plate is preferably provided with additional barrier strips entirely similar to 62, fitting between the several stator lamination blocks. A bolt is then passed through the upper pressure plate into central plug 67 to hold the parts in firm assembled relation.

Plastic in a liquid state is then poured into the region between the opposed casting plates, and between central block 67 and outer stator ring 37, to completely fill this entire region. The plastic is then cured at an elevated temperature so that it become solidified, whereafter the cured plastic is cooled. As it cools, the plastic tends to contract thereby firmly holding the entire assembly together in the manner described in reference to FIG. 1.

After the plastic has been cured and cooled, central plug 67, radial plugs 65 and 66, radial Teflon tubes 64, and the casting plates 60 are all removed. The final structure is one wherein the several lamination stacks, coils, and outer stator ring are all held in desired position relative to one another by means of the cured plastic matrix material, with radial voids adapted for use as cooling channels being provided between the several lamination stacks. The stator can be used in an air-cooled axial airgap machine in the form thus provided. If it is desired, however, to use the radial channels for liquid cooling, the inner ends of the radial channels created within the plastic matrix can be joined together by means of a channel shaped ring manifold of heavy neoprene silastic which is compressed and cemented in place in the position generally designated 68 (FIG. 5) so that said manifold bears on and seals against the smooth surface imparted in the plastic by the plug form member 67.

While I have thus described the preferred embodiment of the present invention, many variations will be suggested to those skilled in the art; and it must therefore be understood that the foregoing description is intended to be illustrative only and not limitative of my invention. All such variations and modifications as are in accord with the principles described are meant to fall within the scope of the appended claims.

Having thus described my invention I claim:

1. The method of fabricating a dynamo-electric machine structure comprising the steps of fabricating a plurality of blocks of magnetic material each of which comprises a comparatively wide end portion provided with peripheral depressions, each such magnetic block also having a narrower central portion protruding from its end portion and having a free end spaced from said end portion, positioning a first plurality of said blocks in a circular array with the end portions of said blocks being substantially coplanar and with the narrower central portions of said blocks extending in substantially parallel relation to one another, said narrow central portions being spaced from one another to provide a radially extending space between each adjacent pair of blocks, placing electrical windings between and around said narrower central portions, superposing a second plurality of said blocks upon said first plurality of blocks with the free ends of said second plurality of blocks abutting the free ends of said first plurality of blocks, pouring a solidifiable liquid plastic material around said first and second pluralities of blocks and around said windings with portions of said plastic material extending into the peripheral depressions in the end portions of each of said pluralities of blocks, heating said plastic material to cure it, and then cooling said cured material to shrink said material and to press the superposed blocks into firm engagement with one another by forces exerted between the peripheral depressions in the opposing end portions of each pair of said superposed blocks.

2. The method of claim 1 including the step of forming apertures in the free ends of said narrower central portions of said blocks, and inserting pins in said apertures to align said pairs of superposed blocks when said second plurality of blocks is superposed on said first plurality of blocks.

3. The method of claim 1 including the step of applying cement to said free ends prior to superposing said second plurality of blocks on said first plurality of blocks.

4. The method of claim 1 wherein said step of placing electrical windings between and around said blocks only partially fills the radial spaces between adjacent pairs of said blocks, inserting plug structures into those portions of the radial spaces between blocks which remain exposed after said windings are in place, pouring said solidifiable liquid plastic material around said blocks, windings, and plug structures, and, subsequent to solidification of said plastic material, removing said plug structures to leave radially extending open channels between radially adjacent ones of said blocks.

5. The method of claim 1 wherein said step of placing electrical windings includes the prior step of preforming electrical coils by winding rectangular cross-section conductors about a forming structure to produce coils having first coil sections, adapted to be inserted radially between said blocks, joined by intervening curved coil sections to second coil sections, adapted to extend arcuately about the peripheries of said blocks, said winding step being conducted to yield the same coil thickness in said first and second coil sections and in said intervening curved coil sections.

6. The method of claim 4 wherein said step of positioning said blocks comprises placing said blocks in a circular casting plate having radially spaced barrier means for retaining each block in position, said step of inserting plug structures comprising radially inserting hollow tubes into said exposed radial spaces, inserting removable plugs into the inner and outer opposing ends of said radial tubes, and then placing a central plug into said casting plate with the outer periphery of said central plug in engagement with the inner ones of said removable plugs.

7. The method of claim 1 wherein said step of fabricating said blocks comprises cementing plural laminations to one another with an electrically insulating material, and then baking said cemented laminations.

8. The method of claim 1 wherein said pouring step completely covers said windings and said central portions of said blocks and only partially covers the end portions of said blocks.

References Cited

UNITED STATES PATENTS

| 2,055,175 | 9/1936 | Franz | 29—606 |
| 3,275,863 | 9/1966 | Fodor | 310—268 |
| 3,277,323 | 10/1966 | Parker | 310—268 |
| 3,328,617 | 6/1967 | Preece | 29—596 UX |

JOHN F. CAMPBELL, Primary Examiner

C. E. HALL, Assistant Examiner

U.S. Cl. X.R.

29—598, 606, 609; 264—263, 272; 310—154, 254